United States Patent
Rath et al.

(10) Patent No.: US 11,140,414 B2
(45) Date of Patent: Oct. 5, 2021

(54) METHOD AND APPARATUS FOR MOST PROBABLE MODE (MPM) REORDERING FOR INTRA PREDICTION

(71) Applicant: InterDigital VC Holdings, Inc., Wilmington, DE (US)

(72) Inventors: Gagan Rath, Cesson-Sevigne (FR); Fabien Racape, Palo Alto, CA (US); Tangi Poirier, Cesson-Sevigne (FR); Fabrice Leleannec, Cesson-Sevigne (FR)

(73) Assignee: InterDigital VC Holdings, Inc., Wilimington (DE)

( * ) Notice: Subject to any disclaimer, the term of this patent is extended or adjusted under 35 U.S.C. 154(b) by 0 days.

(21) Appl. No.: 16/609,111

(22) PCT Filed: Apr. 26, 2018

(86) PCT No.: PCT/EP2018/060815
§ 371 (c)(1),
(2) Date: Oct. 28, 2019

(87) PCT Pub. No.: WO2018/202558
PCT Pub. Date: Nov. 8, 2018

(65) Prior Publication Data
US 2020/0169752 A1     May 28, 2020

(30) Foreign Application Priority Data

May 4, 2017   (EP) .................................... 17305500

(51) Int. Cl.
*H04N 19/593*   (2014.01)
*H04N 19/176*   (2014.01)

(52) U.S. Cl.
CPC ......... *H04N 19/593* (2014.11); *H04N 19/176* (2014.11)

(58) Field of Classification Search
CPC ............................ H04N 19/593; H04N 19/11
See application file for complete search history.

(56) References Cited

U.S. PATENT DOCUMENTS 8,891,889 B2    11/2014 Yu et al.
2010/0195715 A1  8/2010 Liu et al.
(Continued)

FOREIGN PATENT DOCUMENTS

EP           2751999 A1    7/2014
WO    WO2012167119 A1    12/2012
(Continued)

OTHER PUBLICATIONS

Seregin et al., "Neighbor based intra most probable modes list derivation", Joint Video Exploration Team (JVET), Document: JVET-C005, 3rd Meeting: Geneva, CH, May 26-Jun. 1, 2016.
Anonymous, ITU-T H.265 Series H: "High Efficiency Video Coding", Series H: Audiovisual and Multimedia Systems, Infrastructure of audiovisual services—Coding of moving video, Apr. 2013.
(Continued)

*Primary Examiner* — Jerry T Jean Baptiste
(74) *Attorney, Agent, or Firm* — Xiaoan Lu

(57) ABSTRACT

To construct an MPM set for encoding or decoding an intra prediction mode, a plurality of neighbor blocks may be used. In one implementations, two above-intermediate neighbor blocks, such as those specified by sample locations at a distance equal to the height or half of the width may be used for a flat rectangular block, or two left-intermediate neighbor blocks, such as those specified by sample locations at a distance equal to the width or half of the height may be used for a tall rectangular block. The order of searching the neighbor blocks can be based on the current block's shape, or based on the distance between a neighbor's intra prediction mode and a vertical or horizontal intra prediction mode. Both the encoder and decoder follow the same MPM set
(Continued)

construction process. Hence, no additional syntax elements are needed to signal the neighbor blocks and the search order.

20 Claims, 11 Drawing Sheets

(56) References Cited

U.S. PATENT DOCUMENTS

| | | |
|---|---|---|
| 2012/0021960 A1 | 1/2012 | Wenk et al. |
| 2012/0219064 A1 | 8/2012 | Zheng et al. |
| 2012/0314766 A1 | 12/2012 | Chien et al. |
| 2013/0028964 A1 | 1/2013 | Tang et al. |
| 2013/0107963 A1 | 5/2013 | Wahadaniah et al. |
| 2016/0142710 A1 | 5/2016 | Li et al. |
| 2018/0295384 A1* | 10/2018 | Son .................. H04N 19/182 |
| 2020/0275124 A1* | 8/2020 | Ko .................... H04N 19/11 |

FOREIGN PATENT DOCUMENTS

| | | |
|---|---|---|
| WO | WO2013067334 A2 | 5/2013 |
| WO | WO2015176678 A1 | 11/2015 |

OTHER PUBLICATIONS

Chen et al., "Further improvements to HMKTA-1.0", ITU—Telecommunications Standardization Sector, Study Group 16 Question 6, Video Coding Experts Group (VCEG), Document VCEG-AZ07 v2, 52nd Meeting, Warsaw, Poland: Jun. 19-26, 2015.

Seregin et al., "Block shape dependent intra mode coding", Joint Video Exploration Team (JVET), Document: JVET-D0114r1, 4th Meeting: Chengdu, CN, Oct. 15-21, 2016.

Chen et al., "Algorithm Description of Joint Exploration Test Model 3", Joint Video Exploration Team (JVET), Document: JVET-C1001 v1, 3rd Meeting: Geneva, CH, May 26-Jun. 1, 2016.

Huang et al., "EE2.1: Quadtree plus binary tree structure integration JEM tools", Joint Video Exploration Team (JVET), Document: JVET-C0024, 3rd Meeting: Geneva, CH, May 26-Jun. 1, 2016.

* cited by examiner

METHOD AND APPARATUS FOR MOST PROBABLE MODE (MPM) REORDERING FOR INTRA PREDICTION

This application claims the benefit, under 35 U.S.C. § 371 of International Application No. PCT/EP18/060815, filed Apr. 26, 2018, which was published on Nov. 8, 2018, which claims the benefit of European Patent Application No. EP17305500.5 filed May 4, 2017.

TECHNICAL FIELD

The present embodiments generally relate to a method and an apparatus for video encoding and decoding, and more particularly, to a method and an apparatus for encoding and decoding intra prediction information.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized and entropy coded. To reconstruct the video, the compressed data is decoded by inverse processes corresponding to the prediction, transform, quantization and entropy coding.

SUMMARY

According to a general aspect of the present principles, a method for video encoding is presented, comprising: accessing a block of a picture; determining an intra prediction mode for said block; accessing a plurality of neighbor blocks of said block, said plurality of neighbor blocks of said block including a first neighbor block and a second neighbor block, wherein a first side of said first neighbor block and a first side of said second neighbor block are immediately adjacent to a side of said block; determining a most probable mode (MPM) set for said block, said MPM set including intra prediction modes of said plurality of neighbor blocks; and encoding an index corresponding to said determined intra prediction mode in said MPM set.

According to another general aspect of the present principles, a method for video decoding is presented, comprising: accessing data indicative of a block of a picture from a bitstream; accessing a plurality of neighbor blocks of said block, said plurality of neighbor blocks of said block including a first neighbor block and a second neighbor block, wherein a first side of said first neighbor block and a first side of said second neighbor block are immediately adjacent to a side of said block; determining a most probable mode (MPM) set for said block, said MPM set including intra prediction modes of said plurality of neighbor blocks; and decoding an index in said MPM set; determining an intra prediction mode for said block corresponding to said index in said MPM set; and decoding said block based on said determined intra prediction mode.

According to another general aspect of the present principles, an apparatus for video encoding is presented, comprising at least a memory and one or more processors, said one or more processors configured to: access a block of a picture; determine an intra prediction mode for said block; access a plurality of neighbor blocks of said block, said plurality of neighbor blocks of said block including a first neighbor block and a second neighbor block, wherein a first side of said first neighbor block and a first side of said second neighbor block are immediately adjacent to a side of said block; determine a most probable mode (MPM) set for said block, said MPM set including intra prediction modes of said plurality of neighbor blocks; and encode an index corresponding to said determined intra prediction mode in said MPM set.

According to another general aspect of the present principles, an apparatus for video decoding is presented, comprising at least a memory and one or more processors, said one or more processors configured to: access data indicative of a block of a picture from a bitstream; access a plurality of neighbor blocks of said block, said plurality of neighbor blocks of said block including a first neighbor block and a second neighbor block, wherein a first side of said first neighbor block and a first side of said second neighbor block are immediately adjacent to a side of said block; determine a most probable mode (MPM) set for said block, said MPM set including intra prediction modes of said plurality of neighbor blocks; and decode an index in said MPM set; determine an intra prediction mode for said block corresponding to said index in said MPM set; and decode said block based on said determined intra prediction mode.

In one exemplary embodiment, none of other three sides of said first neighbor block is disposed along with or beyond any side of said block.

In another exemplary embodiment, said first neighbor block and said second neighbor block may be immediately adjacent to said block along a longer side of said block. Said first neighbor block and said second neighbor block may also be immediately adjacent to each other.

To select said first neighbor block, a sample adjacent to said block may be selected, along a longer side of said block, wherein said sample is located at a distance smaller than a length of said longer side of said block, and wherein said first neighbor block is specified by said selected sample. In one example, said sample may be located at a distance equal to a height of said block or at a distance half of a width of said block, for a flat block (height of said block being smaller than width of said block). In another example, said sample may be located at a distance equal to a width of said block or at a distance half of a height of said block, for a tall block (width of said block being smaller than height of said block).

To choose said MPM set, a distance between an intra prediction mode of each of said accessed plurality of neighbor blocks of said block and one of a vertical and horizontal intra prediction modes may be determined, wherein said MPM set uses intra prediction modes from up to N blocks of said plurality of neighbor blocks, wherein N is an integer, and wherein said N neighbor blocks correspond to smaller distances than other neighbor blocks in said plurality of neighbor blocks.

In one embodiment, said distance may be determined between each of said accessed plurality of neighbor blocks of said block and a nearer one of said vertical and horizontal intra prediction modes. A subset of neighbor blocks along a longer side of said block can be selected before another subset of neighbor blocks along a shorter side of said block.

In another embodiment, said distance may be determined between each of said accessed plurality of neighbor blocks of said block and said vertical intra prediction mode, for a tall block (width of said block being smaller than height of said block), and said distance may be determined between each of said accessed plurality of neighbor blocks of said block and said horizontal intra prediction mode, for a flat block (width of said block being greater than height of said block).

In addition to intra prediction modes of neighbor blocks, said MPM set may include at least one of a planar intra prediction mode and a DC intra prediction mode. Intra prediction modes in said MPM set may be indexed based on a shape of said block.

According to another general aspect of the present principles, a video signal is formatted to include encoded data representative of a block of a picture, wherein said encoded data is formatted by: determining an intra prediction mode for said block; accessing a plurality of neighbor blocks of said block, said plurality of neighbor blocks of said block including a first neighbor block and a second neighbor block, wherein a first side of said first neighbor block and a first side of said second neighbor block are immediately adjacent to a side of said block; determining a most probable mode (MPM) set for said block, said MPM set including intra prediction modes of said plurality of neighbor blocks; and encoding an index corresponding to said determined intra prediction mode in said MPM set.

The present embodiments also provide a computer readable storage medium having stored thereon instructions for encoding or decoding video data according to the methods described above. The present embodiments also provide a computer readable storage medium having stored thereon a bitstream generated according to the methods described above. The present embodiments also provide a method and an apparatus for transmitting the bitstream generated according to the methods described above.

DETAILED DESCRIPTION

Figure 1:
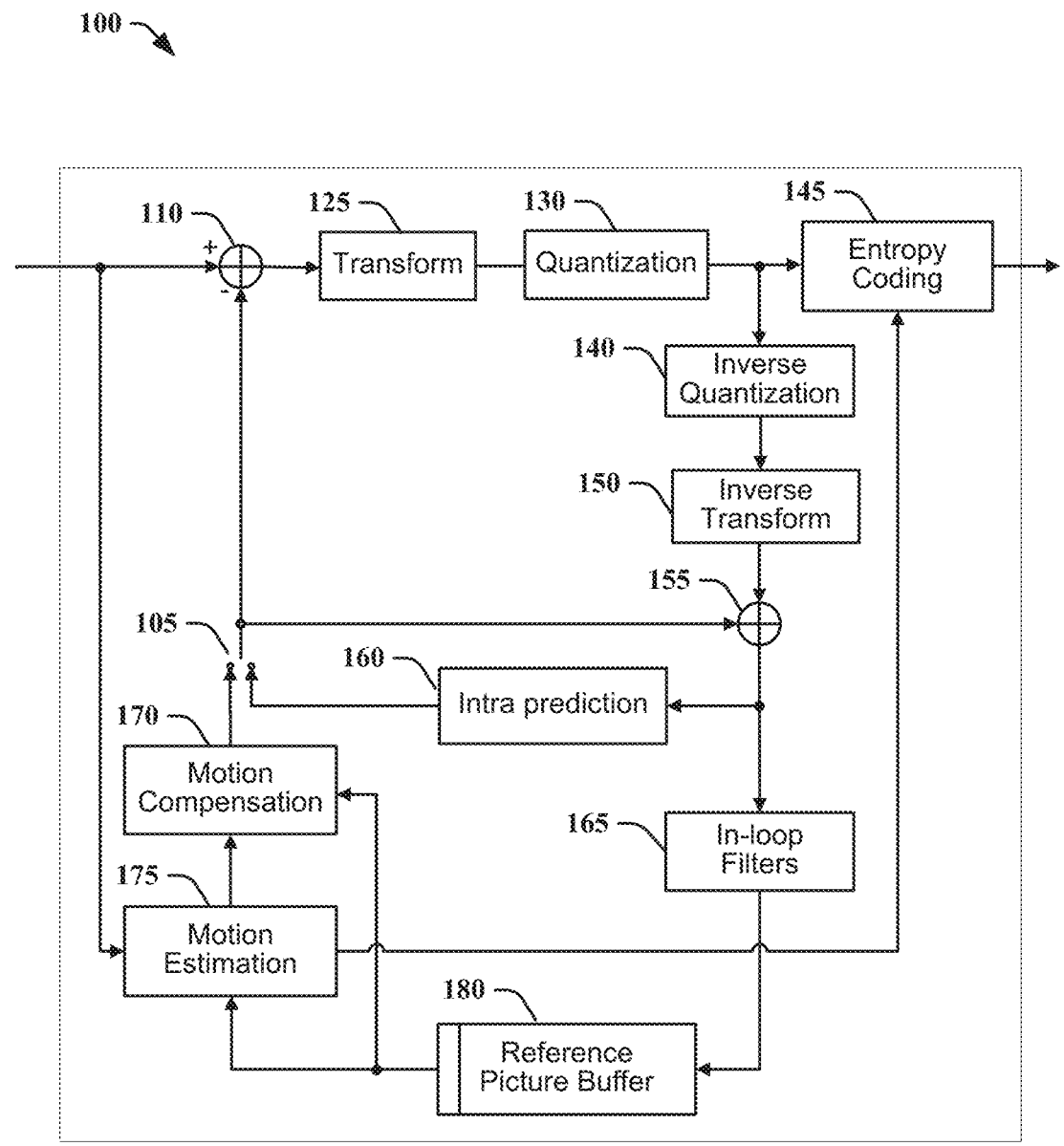
FIG. 1 illustrates a block diagram of an exemplary HEVC (High Efficiency Video Coding) video encoder.

FIG. 1 illustrates an exemplary HEVC encoder 100. To encode a video sequence with one or more pictures, a picture is partitioned into one or more slices where each slice can include one or more slice segments. A slice segment is organized into coding units, prediction units and transform units.

In the present application, the terms "reconstructed" and "decoded" may be used interchangeably, the terms "picture" and "frame" may be used interchangeably, and the terms "MPM list" and "MPM set" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

In order to exploit the spatial redundancy, CUs in intra mode are predicted from reconstructed neighboring samples within the same slice. The causal neighboring CUs have already been encoded/decoded when the encoding/decoding of the current CU is considered. To avoid mismatch, the encoder and the decoder have the same prediction. Therefore, both the encoder and the decoder use the information from the reconstructed/decoded neighboring causal CUs to form prediction for the current CU.

The intra prediction process in HEVC includes three steps: (1) reference sample generation, (2) intra sample prediction and (3) post-processing of predicted samples.

Figure 2A:
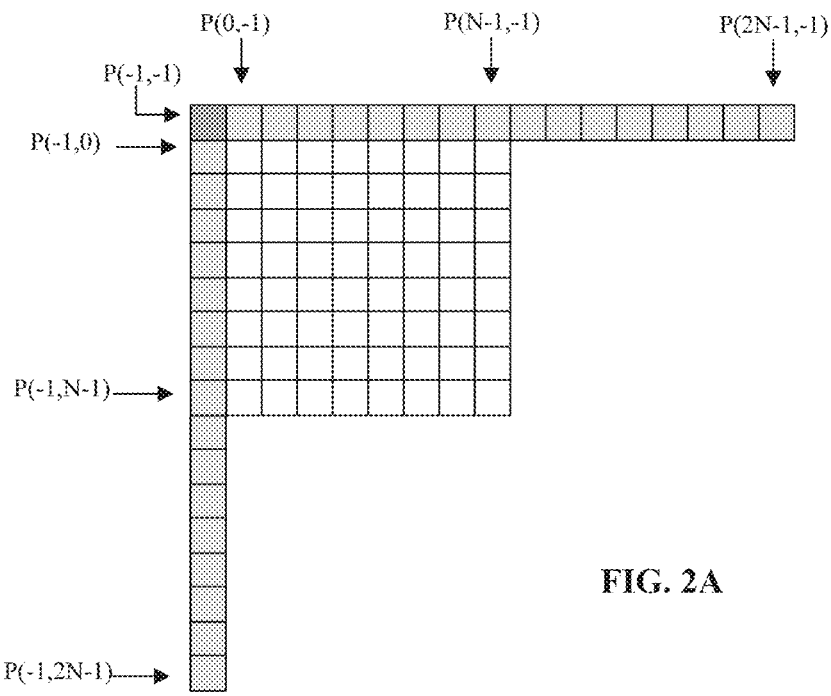
FIG. 2A is a pictorial example depicting the HEVC reference sample generation.

Exemplary HEVC reference samples are illustrated in FIG. 2A, where the pixel value at coordinate (x,y) with respect to the above left corner of the current block, is indicated by P(x,y). For a CU of size N×N, a row of 2N decoded samples on the top is formed from the decoded CUs. Similarly, a column of 2N samples on the left is formed from the decoded CUs. The corner pixel from the above-left decoded CU is used to fill up the gap between the above row and the left column references. If some of the samples are not available, for example, when the corresponding CUs is not in the same slice or the current CU is at a frame boundary, then reference sample substitution is performed where the missing samples are copied from the available samples in a clock-wise direction. Then, depending on the current CU size and the prediction mode, the reference samples are filtered using a specified filter.

Figure 2B:
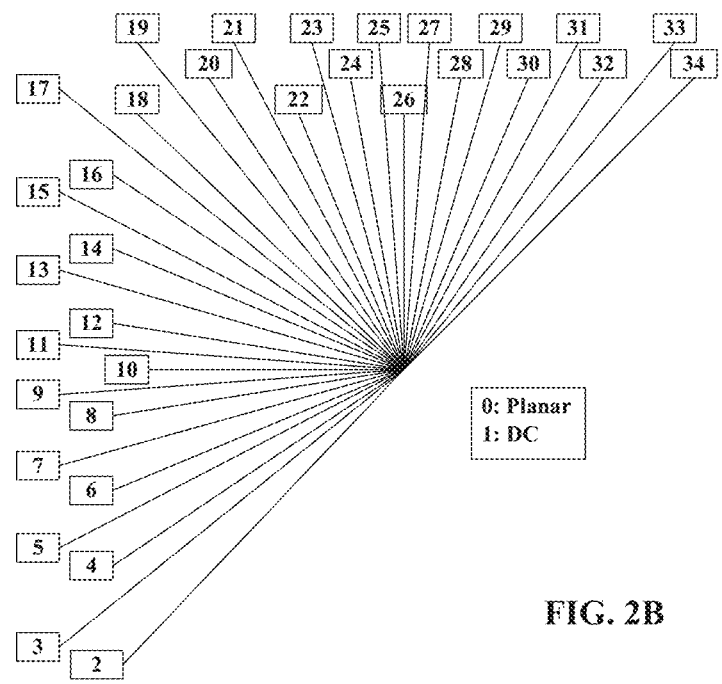
FIG. 2B is a pictorial example depicting intra prediction directions in HEVC.

The next step, i.e., the intra sample prediction, consists of predicting the pixels of the target CU based on the reference samples. In order to predict different kinds of content efficiently, HEVC supports a range of prediction methods. In particular, planar and DC prediction modes are used to predict smooth and gradually changing regions, whereas angular prediction modes (also referred to as "directional prediction modes") are used to capture different directional structures. HEVC supports 33 directional prediction modes which are indexed from 2 to 34. These prediction modes correspond to different prediction directions as illustrated in FIG. 2B, wherein the numbers denote intra prediction mode indices. Some of the prediction modes such as the DC mode and directly horizontal (i.e., mode 10) and directly vertical modes (i.e., mode 26) may cause discontinuity at the CU boundaries of the prediction samples. Therefore, such prediction modes are followed by a post-processing step where the boundary of the predicted samples are smoothed using a low-pass filter. Here, directly horizontal mode refers to the prediction mode when the reference samples on the left side of a target block are repeated horizontally to the right for intra prediction. Similarly, directly vertical mode refers to the prediction mode when the reference samples on the top of a target block are repeated vertically down for intra prediction.

Since there are multiple intra prediction modes available, the decoder needs the mode information to form the prediction for an intra-coded CU. The encoder encodes this information using a most probable mode (MPM) set for the luma component. HEVC specifies an MPM set consisting of three distinct modes, which is constructed from the prediction modes of the intra coded CUs on the top and left of the current CU, the planar mode, the DC mode, and the directly vertical mode.

Specifically, HEVC considers three most probable modes, MPM0, MPM1 and MPM2, when coding the luma intra prediction mode predictively, as shown in Table 1, where "L" represents the intra prediction mode of the neighboring left block and "A" represents the intra prediction mode of the neighboring above block. The neighboring blocks may have different sizes than the current block. Among the three most probable modes, the first two are initialized by the luma intra prediction modes of the above and left PBs if those PBs are available and are coded using an intra prediction mode. Any unavailable intra prediction mode is considered to be the DC mode.

TABLE 1

| Conditions | | MPM0 | MPM1 | MPM2 |
|---|---|---|---|---|
| L = A | L ≠ Planar and L ≠ DC | L | L − 1 | L + 1 |
| | Otherwise | Planar | DC | 26 (Vertical) |
| L = A other-wise | L ≠ Planar and A ≠ Planar | L | A | Planar |
| | L ≠ DC and A ≠ DC | L | A | DC |
| | otherwise | L | A | 26 (Vertical) |

When the first two most probable modes are not equal, the first most probable mode (MPM0) is set to L, the second most probable mode (MPM1) is set to A, and the third most probable mode (MPM2) is set equal to the Planar mode, DC, or vertical, according to which of these modes, in this order, is not a duplicate of one of the first two modes. When the first two most probable modes are the same, if this first mode has the value Planar or DC, the three most probable modes are assigned as Planar, DC and vertical, in that order. When the first two most probable modes are the same and the first mode has an angular value, the second and third most probable modes are chosen as the two adjacent angular prediction modes of the first MPM.

The applicable luma intra prediction mode for the current block can be coded using two different options. If the prediction mode of the current block is included in the constructed list of three most probable modes, the mode is signaled by an index of the mode in the MPM set using variable length coding. Specifically, a single-bit flag prev_intra_luma_pred_flag is set to 1 to indicate that the prediction mode of the current block is equal to one of these three MPM modes, where index 0 is signaled with bit '0' for MPM0, index 1 is signaled with bits '10' for MPM1, and index 2 is signaled with bits '11' for MPM2. If the prediction mode is not equal to any mode in the MPM set, then the flag prev_intra_luma_pred_flag is set to 0 and the index of the current luma prediction mode excluding the three MPMs is indicated using a 5-bit fixed length code. For the chroma components, the prediction mode is signaled as the same mode for the luma (called derived mode) by using one bit, or one of the four modes (planar, DC, directly vertical, directly horizontal) using three bits. If any of these four modes equals the derived mode, then it is replaced by mode 34 with the same three-bit signaling as originally assigned.

For an inter CU, the corresponding coding block is further partitioned into one or more prediction blocks. Inter prediction is performed on the PB level, and the corresponding PU contains the information about how inter prediction is performed. The motion information (i.e., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 3:
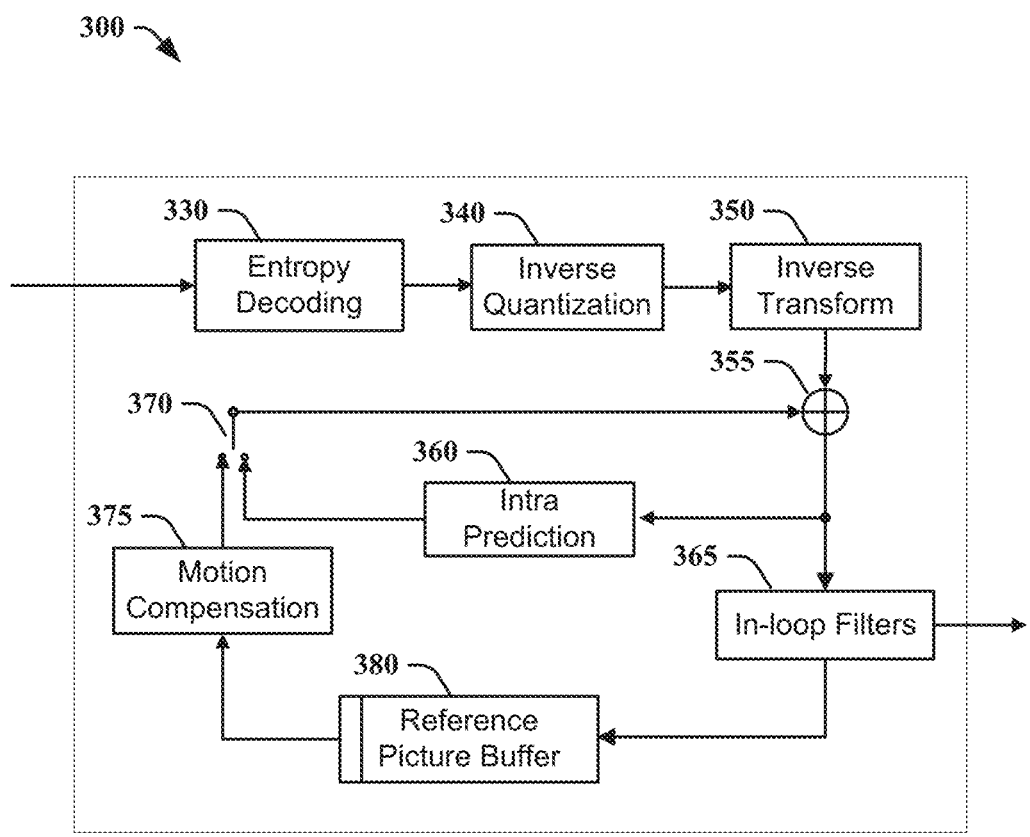
FIG. 3 illustrates a block diagram of an exemplary HEVC video decoder.

FIG. 3 illustrates a block diagram of an exemplary HEVC video decoder 300. In the exemplary decoder 300, a bitstream is decoded by the decoder elements as described below. Video decoder 300 generally performs a decoding pass reciprocal to the encoding pass as described in FIG. 1, which performs video decoding as part of encoding video data.

In particular, the input of the decoder includes a video bitstream, which may be generated by video encoder 100. The bitstream is first entropy decoded (330) to obtain transform coefficients, motion vectors, and other coded information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). As described above, AMVP and merge mode techniques may be used to derive motion vectors for motion compensation, which may use interpolation filters to calculate interpolated values for sub-integer samples of a reference block. In-loop filters (365) are applied to the reconstructed image. The filtered image is stored at a reference picture buffer (380).

As described above, in HEVC, encoding of a frame of video sequence is based on a block structure. A frame is divided into square coding tree units (CTUs), which may undergo quadtree (QT) splitting to multiple coding units based on rate-distortion criteria. Each CU is either intra-predicted, that is, spatially predicted from the causal neighbor CUs, or inter-predicted, that is, temporally predicted from reference frames already decoded. In I-slices all CUs are intra-predicted, whereas in P and B slices the CUs can be either intra or inter-predicted. For intra prediction, HEVC defines 35 prediction modes which include one planar mode (indexed as mode 0), one DC mode (indexed as mode 1) and 33 angular modes (indexed as modes 2-34).

In JEM (Joint Exploration Model) under study by the Joint Video Exploration Team (JVET) for designing the next generation video compression standard, the QTBT (Quadtree plus Binary Tree) structure removes the concept of multiple partition types in HEVC, i.e., removes the separation of CU, PU and TU concepts.

Figure 4A:
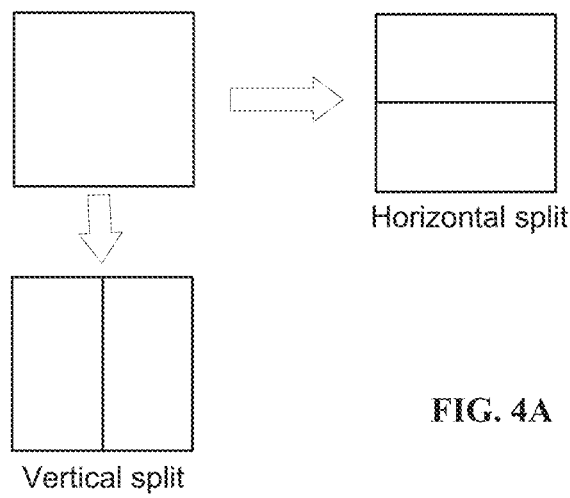
FIG. 4A and FIG. 4B are pictorial examples depicting the binary tree splitting in JVET of (1) a square block and (2) a rectangular block, respectively.
Figure 4B:
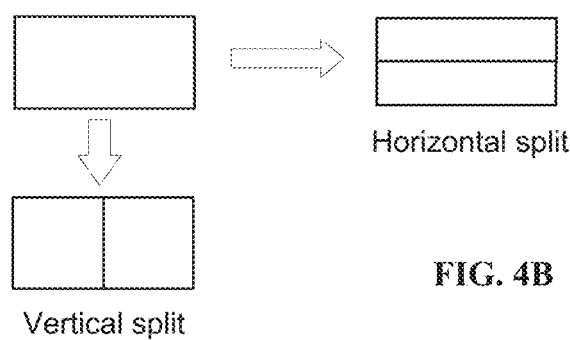

If a CU results from a quadtree splitting of a block, the CU is of square shape. If a CU results from a binary tree splitting of a block, the CU can be either square or rectangular depending on the shape of the parent block and the type of splitting. In a binary tree, a block can be split either horizontally, or vertically, as exemplified in FIG. 4A. The splitting is done symmetrically resulting in two identical CUs. In a horizontal splitting, the resulting CUs have the same width as the parent block but their heights are half of that of the parent block; and in a vertical splitting, the resulting CUs have the same height as the parent block but their widths are half of that of the parent block. If the parent block is of square shape, then the resulting CUs are rectangular. If the parent block is rectangular, the resulting CUs can be either rectangular or square, as shown in FIG. 4B.

A Coding Tree Unit (CTU) is firstly partitioned by a quadtree structure. The quadtree leaf nodes are further partitioned by a binary tree structure. The binary tree leaf node is named as Coding Units (CUs), which is used for prediction and transform without further partitioning. Thus, the CU, PU and TU have the same block size in the new coding QTBT block structure. In JEM, a CU consists of Coding Blocks (CBs) of different color components. For ease of notation, the CUs or blocks resulting from a binary tree partition are also referred to as binary tree (BT) CUs or blocks, and the CUs or blocks resulting from a quadtree partition are also referred to as quadtree CUs or blocks. QT CUs are all square shape, while BT CUs can be rectangular or square shape.

As possible improvements to HEVC, JEM 2.0 uses 65 directional intra prediction modes in addition to the planar and DC modes. The 65 directional prediction modes include the 33 directional modes specified in HEVC plus 32 additional directional modes that correspond to angles in-between two original angles. The number of prediction modes was increased to adapt to the increased CTU block size, currently set to 128×128 pixels. With a QTBT structure, the basic prediction is similarly performed as done in HEVC irrespective of the CU size, but with added tools such as Reference Sample Adaptive Filtering (RSAF) and Position Dependent Intra Prediction Combination (PDPC).

To encode the intra prediction mode for luma, the concept of using an MPM set is maintained in JEM 2.0. However, the number of candidates in the MPM set has been increased to six. In JEM 2.0, the left and above intra modes are initialized with the DC intra mode. After the initialization, the intra modes from all the above available neighbors are analyzed and the most frequent mode is selected as the above intra mode (i.e., "A"). The same process is repeated for the left neighbors, and the most frequent intra mode is selected as the left mode (i.e., "L"). The six distinct modes are selected based on the intra prediction modes of causal neighbor blocks as described in Table 2, where "Max" denotes one of L and A with the larger mode index.

In JEM and HEVC reference software, when a CU has a certain intra mode, all 4×4 blocks inside that CU are marked with that mode. To choose a neighbor block, a sample location is chosen and the intra mode of the 4×4 block covering the chosen sample position is used as the neighbor intra block, while the corresponding CU may span a larger area than 4×4, to the left or right.

TABLE 2

| Conditions | | | MPM0 | MPM1 | MPM2 | MPM3 | MPM4 | MPM5 |
|---|---|---|---|---|---|---|---|---|
| L = A | L ≠ Planar and L ≠ DC | | L | Planar | L + 1 | L − 1 | L + 2 | DC |
| | Otherwise | | Planar | DC | 26 (Ver) | 10 (Hor) | 2 | 18 |
| L ≠ A | L ≠ Planar and A ≠ Planar | L = DC or A = DC | L | A | Planar | Max − 1 | Max + 1 | Max + 2 |
| | | otherwise | L | A | Planar | DC | Max + 1 | Min − 1 |
| | otherwise | L + A < 2 | L | A | 26 (Ver) | 10 (Hor) | 2 | 18 |
| | | otherwise | L | A | DC | Max − 1 | Max + 1 | Max + 2 |

Figure 5:
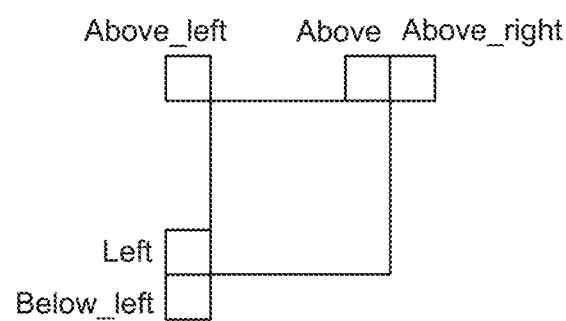
FIG. 5 illustrates five causal neighbor blocks for a current Coding Unit (CU) in JVET MPM set construction.

In JEM 3.0, intra mode coding with modified MPM list derivation is used in order to simplify the derivation process in JEM 2.0, as described in JVET-00055 by V. Seregin et al., entitled "Neighbor based intra most probable modes list derivation," JVET 3rd Meeting, Geneva, CH, 26 May-1 Jun. 2016. In particular, only five neighbor intra prediction modes: left (L), above (A), below_left (BL), above_right (AR), and above_left (AL) as shown in FIG. 5, are considered for the MPM list construction.

First, the left neighbor block ("Left") is checked. If the left block is available and is intra predicted, then its prediction mode is included in the set as the first candidate. Then the above neighbor block ("Above") is checked for availability and intra prediction. If both conditions are satisfied, then the intra prediction mode for the above block is compared to the one already included in the set. If not already included in the set, the above intra prediction mode is included as the second candidate in the MPM set. Then the planar and DC prediction modes are checked to be included in the set. After this, the below-left ("Below_left"), above-right ("above_right") and above-left ("Above_left") blocks, in that order, are checked for availability and included in the set if not already included. As the modes are included in the set, their order is maintained.

Thus, the MPM set is initially formed by adding five neighbor intra prediction modes, planar, and DC modes into the MPM set. However, only unique modes can be included into the MPM set. The order in which the initial modes are included is left, above, planar, DC, below left, above right, and above left. In some cases, one or more of the five neighbor blocks may not exist or may not use intra mode. In JEM 3.0, the codec checks the availability of an intra mode from a neighbor, and skips the neighbor if it is not available or if it does not use intra mode. In the present application, we may also refer to the order of checking the neighbors as a "search order." If the MPM set is not complete after adding neighbor intra modes, planar and DC modes, i.e., the number of modes in the list is still less than six, then derived modes are added, where the derived intra modes are obtained by adding adjacent modes, i.e., −1 or +1 to the angular modes which are already in the MPM set. It should be noted that derivation is not applied to non-angular modes (i.e., DC or planar).

If the MPM set still contains less than six distinct modes, the modes from a default set are checked for inclusion in the MPM set. The default set contains six distinct modes, namely, DC, planar, vertical, horizontal, 2, and diagonal. Since the DC and planar modes are already included in the MPM set, only the remaining four, i.e., vertical, horizontal, 2, and diagonal, are checked in that order for inclusion in the set. If not already included, the checked mode is included in the set. This process is iterated until the MPM set contains six distinct modes. The default set is a set as default, i.e., in case we do not have any member in the MPM set we are building, this set will be the MPM set since all its members will be copied to the MPM set.

Both the encoder and the decoder construct the MPM set exactly in the same manner, and as a result, their MPM sets for any given intra-predicted CU are identical at the encoder and decoder sides.

To encode the intra prediction mode of an intra-predicted CU in JEM 3.0, first the encoder checks if the intra prediction mode belongs to the MPM set of the current CU. If so, a flag (namely, MPM flag) is enabled and the index of the candidate MPM mode (i.e., the MPM mode that equals the current CU's intra prediction mode) in the MPM set is signaled. The index is signaled using a truncated unary (TU) code as shown in Table 3.

TABLE 3

| Candidate Index | code |
|---|---|
| 0 | 0 |
| 1 | 10 |
| 2 | 110 |
| 3 | 1110 |
| 4 | 11110 |
| 5 | 11111 |

If the prediction mode does not belong to the MPM set, the MPM flag is set to 0. The remaining 61 modes are divided into two sets. First the remaining modes are sorted according to their indices in increasing order. The first set, namely the "selected set" contains every fourth mode in the sorted list, and thus contains 16 modes. The second set contains the remaining 45 modes. A set selection flag is signaled to indicate if the prediction mode of the current CU belongs to the selected set or the second set. Then, if the mode belongs to the selected set, the candidate is signaled using a 4-bit fixed length code. Otherwise a truncated binary code is used to signal the candidate in the second set.

The design of truncated unary coding of the MPM mode, as the ones used in JEM 3.0, assumes that the MPM modes with lower indices are more probable to be selected than those with higher indices. In general, the prediction modes of the left and above CUs are more correlated with the prediction mode of the current block than the prediction modes of the other three neighbor blocks, if the current CU is of square shape. If the current block is not square, then the above assumption may not be true in general. This is more so when the height and the width of the current CU are different by a large factor (for example, a factor larger than 3). In a QTBT structure, the CUs can be rectangular with one of the sides being much larger than the other. For example, there can be CUs of size 32×4 and 4×32 if the BT starts from quadtree depth 2 (depth 0 corresponds to a 128×128 CTU), that is, QT CU size 32×32, and BT depth is at least 3. In this case, the truncated unary code may not be the optimal one and thus the compression efficiency may be compromised. Therefore, a better approach may be to order causal neighbors according to the configuration of the current CU, as described below in further detail.

The present embodiments are directed to encoding and decoding intra prediction modes. Generally, we consider the shape of the current block when constructing the MPM set for the current block, in order to improve the compression efficiency. In addition, we propose various methods of choosing neighbor blocks for constructing the MPM set. In the following, we use the intra prediction mode coding in JEM 3.0 as the exemplary basis for various modifications to intra coding. However, the present principles can be applied to other video codecs.

Figure 6:
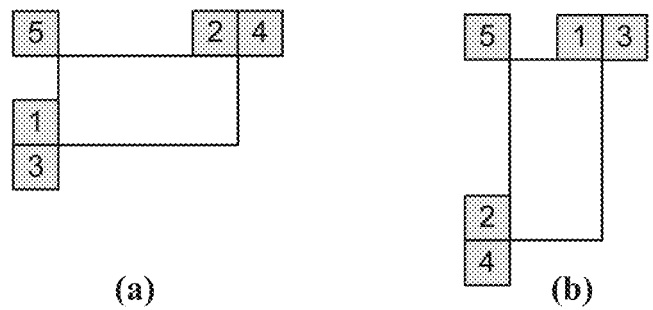
FIG. 6(a) and FIG. 6(b) are pictorial examples depicting the search order of the neighbor's prediction modes for (1) a flat block and (2) a tall block, respectively, according to an embodiment of the present principles.

In one embodiment, for a flat rectangular block (i.e., a block whose width is larger than the height), the five neighbor blocks for its MPM set construction are shown in FIG. 6(a). The numbers associated with the neighbor blocks indicate the order in which their prediction modes will be considered for inclusion in the MPM set. Note that the numbers do not represent the indices of the prediction modes in the MPM set. For a rectangular block shown in FIG. 6(a), the order may work well considering that the above neighbor block ("2") is at a farther distance than the left neighbor block ("1") from the above-left corner ("5," or center) of the current block, and the above_right neighbor ("4") is farther than the below_left neighbor ("3"). Therefore, the current search order, namely, {left, above, below_left, above_right, above_left}, as shown by the numbers, can remain the same as in JEM 3.0.

Now consider a tall rectangular block (namely, a block whose width is smaller than the height). The five neighbor blocks for its MPM set construction are shown in FIG. 6(b). In this case, the above neighbor block ("1") is at a nearer distance than the left neighbor block ("2") from the above-left corner ("5," or center) of the current block, and the above_right neighbor ("3") is nearer than the below_left neighbor ("4").

Therefore, we may construct the MPM set depending on the block shape. If the CU is square (i.e., width=height) or flat (i.e., width>height), then the existing search order is used. If the CU has a tall rectangle shape (i.e., width<height), then we swap the search order between left and above neighbors. Namely, the search order becomes {above, left, below_left, above_right, above_left}. In another embodiment, for CUs having tall rectangle shapes, we also swap the search order between the below_left and above_right neighbors. Namely, the search order becomes {above, left, above_right, below_left, above_left} as shown in FIG. 6(b). The rest of the search process may remain unchanged, which would finally lead to a set of six most probable modes. The encoder and decoder both follow the same procedure to have identical MPM sets for the current CU. As the difference between the lengths of the width and height increases, it is more likely that the above order will include the more probable modes before the less probable modes in the MPM set.

Generally, the MPM set should consist of the modes that are most correlated to the prediction mode of the current block, which may increase the probability of finding an element in the MPM set that is equal to the prediction mode of the current CU, and thus the prediction mode can be encoded more efficiently. In typical video sequences, objects or background areas span several blocks and therefore their directionality or structures over those blocks are often correlated. Thus, we can choose the modes of the causal neighbor blocks because they are available immediately for a current block. In addition, since planar and DC are two special modes that occur very frequently in many sequences, we consider them as well.

The neighbor blocks may not be of the same size as the current block. For example, the current block may have two or three or more blocks spanning its width on the top. Their prediction modes can be different or same. The same applies to the neighbor blocks on the left. Generally, if we can choose the candidate neighbors far from each other (so that they are different from each other and thus we may have good chance of finding one which is equal to the current block's prediction mode), but close to the current block's location (so that they are correlated to the current block's prediction mode), the probability of having the current block's intra mode in the MPM set may be good. If the above neighbor has the same width as the current block, for example, choosing the candidate on the above right, middle, or at equal distance from left origin of the current block has no difference since all of them give the same mode.

Figure 7:
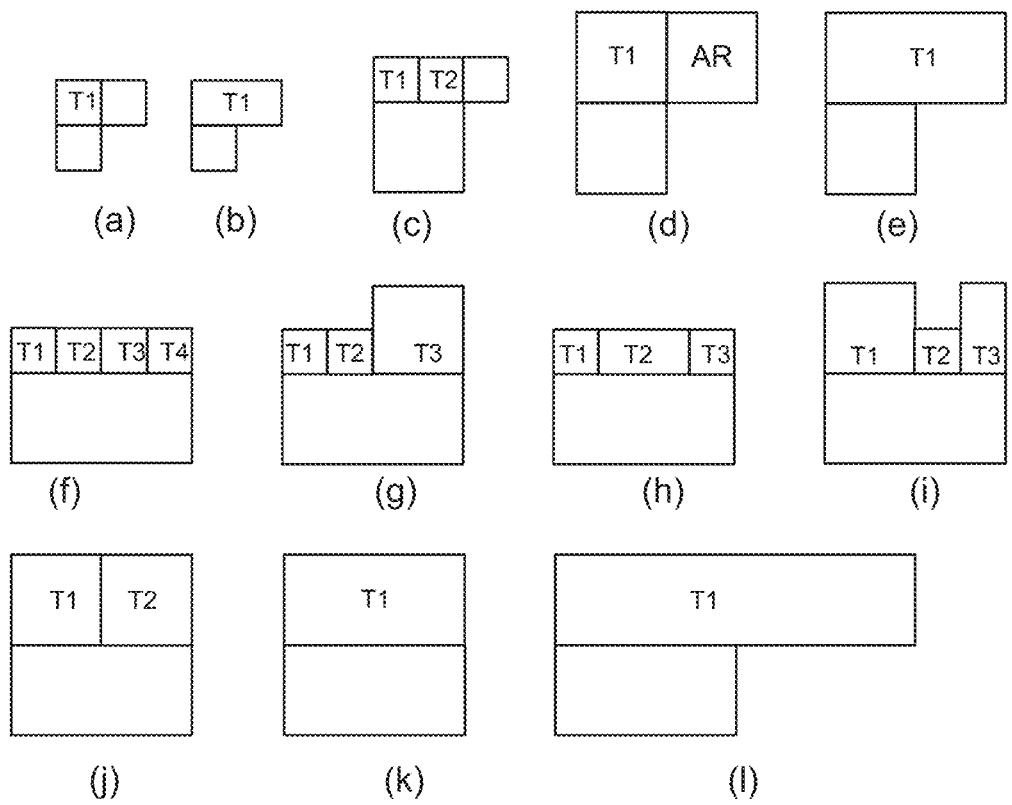
FIGS. 7(a)-7(l) are pictorial examples depicting the above neighbor blocks for a block.

FIG. 7 illustrates various examples of neighbor CUs above a current CU. Here, we regard a neighbor block with a portion of pixels immediately adjacent to the current block on the top as an above neighbor block. The current CU can have multiple neighbor CUs on the top and on the side, and their prediction modes can be all different or same. If the current CU width is at the minimum possible size, for example, 4×4 in HEVC, there can be no more than one neighbor block on the top. Rather, there may be only one CU on top and one on above_right as shown in FIG. 7(a), or there may be just one CU for both above and above_right as shown in FIG. 7(b). If the width of the current CU is 8, there may be two above neighbor CUs of width 4 as shown in FIG. 7(c), one CU of width 8 as FIG. 7(d), or one CU of width 16 as FIG. 7(e). If the width of the current CU is 16, there may be four above neighbor CUs of width 4 as shown in FIG. 8(f), three CUs of width 4, 4 and 8, respectively, as FIG. 7(g), 3 CUs of width 4, 8 and 4, respectively, as FIG. 7(h), three CUs of width 8, 4 and 4, respectively as FIG. 7(i), two CUs of width 8 as FIG. 7(j), one CU of width 16 as FIG. 7(k), and one CU of width 32 as FIG. 7(l). It should be noted that the neighbor blocks as shown in FIG. 7 are for exemplary purposes, and there are other possible layouts, for example, the neighbor blocks may have different heights from what are shown in FIG. 7. For ease of notation, the above neighbor blocks are denoted as T1, T2, T3 and T4 in FIG. 7.

For a current block with multiple neighbor blocks along the side, we may adopt more flexibility in choosing the neighbors, for example, along the longer side of the current block. For example, in the case of flat CUs, we can choose the neighbors as shown in FIG. 8(a) or FIG. 8(b), and in the case of tall CUs, we can choose the neighbors as shown in FIG. 8(c) or FIG. 8(d). Here, for a flat CU, instead of choosing the neighbor blocks at the above-right corner, we can choose the blocks anywhere within its width's distance on top of it, for example, at a distance equal to the height or at half distance along the width; and for a tall CU, instead of choosing the neighbor blocks at the below-left corner, we can choose the blocks anywhere within its height's distance on the left, for example, at a distance equal to the width or at a distance equal to half of the height. For the search order, we can either maintain the same search order as for a square CU, or follow the various orders described above, for example, the one shown in FIG. 6B.

It should be noted here that at least a pixel in an above neighbor block is immediately adjacent (i.e., pixel distance=1 pixel) to a pixel in the current block. Thus, an above-right block "AR" as shown in FIG. 7(d) is not considered as an above neighbor block. Similarly, for a left neighbor block, at least a pixel in a left neighbor block is immediately adjacent to a pixel in the current block. For ease of notations, we call a bottom side of an above neighbor block as being immediately adjacent to an above side of the current block, and a right side of a left neighbor block as being immediately adjacent to a left side of the current block.

More specifically, choosing above neighbor blocks as in FIG. 8(a) can be seen as choosing a block covering sample $P(CU_H, -1)$ and another block covering sample $P(CU_H+1, -1)$, where "$CU_H$" is the height of the current CU. It is possible that a single block covers both sample locations $P(CU_H, -1)$ and $P(CU_H+1, -1)$. Similarly, choosing above neighbor blocks as in FIG. 8(b) can be seen as choosing a block covering sample $P(CU_W/2, -1)$ and another block covering sample $P(CU_W/2+1, -1)$, wherein "$CU_W$" is the width of the current CU. It is possible that a single block covers both sample locations $P(CU_W/2, -1)$ and $P(CU_W/2+1, -1)$. Similarly, for a tall block, choosing new left neighbors can be specified by two sample locations along the vertical direction as shown in FIGS. 8(c) and 8(d).

Figure 8:
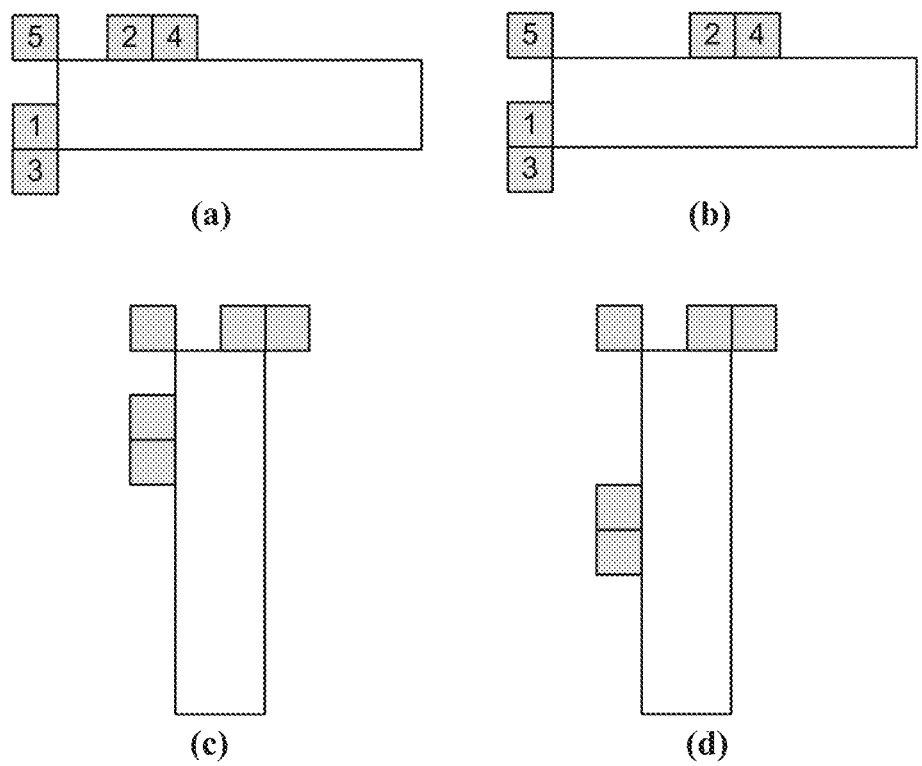
FIGS. 8(a)-8(d) are pictorial examples depicting the neighbor block selections, according to various embodiments of the present principles.

Using the examples of FIGS. 7(f)-7(l), we list in Table 4 the two above neighbor blocks that may be included in the MPM set, based on a distance equal to the height or half of the width as shown in FIG. 8(a) and FIG. 8(b), respectively. For FIGS. 7(f) and 7(g), the selection according to FIG. 8(a) or 8(b) brings two new neighbors in addition to the five neighbors as shown in FIG. 4. For FIG. 7(h) or 7(i), the selection brings one or two new neighbors. For FIG. 7(j), when there are two above neighbors, the selection brings one new neighbor (T1). When there is only one above neighbor block as shown in FIGS. 7(k) and 7(l), the selection of above neighbor according to FIG. 8 does not bring any new neighbor. Note for FIGS. 7(f)-7(l), because the height is half of the width for the current CU, choosing the above neighbor blocks based on the height or half of the width produce the same new neighbors.

TABLE 4

|  | Half of the width | Comments |
| --- | --- | --- |
| FIG. 7(f) | T2, T3 |  |
| FIG. 7(g) | T2, T3 | T3 is above |
| FIG. 7(h) | T2, T2 | T3 is above |
| FIG. 7(i) | T1, T2 | T3 is above |
| FIG. 7(j) | T1, T2 | T2 is above |
| FIG. 7(k) | T1, T1 | T1 is above |
| FIG. 7(l) | T1, T1 | T1 is above, above_right |

Figure 9:
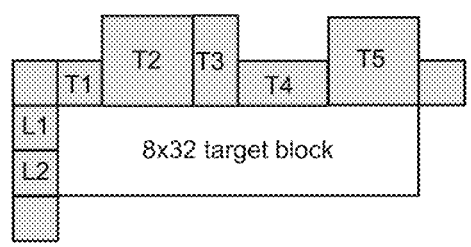
FIG. 9 is a pictorial example depicting the causal neighbor blocks for a block.

When the difference between the width and height of the current CU becomes larger, for example, as shown in FIG. 9, choosing the above neighbor blocks based on the height or half of the width may produce different new neighbors. Specifically, when choosing above neighbor blocks based on the height as shown in FIG. 8(a), T2 is chosen, and when choosing above neighbor blocks based on the half of the width as shown in FIG. 8(b), T3 and T4 are chosen.

In the above, we describe choosing one or two above neighbor blocks based on two sample locations as shown in FIGS. 8(a)-8(d). In another embodiment, we may also generate an initial MPM set using all or a subset of causal neighbors for their prediction modes and then eliminate the ones which are duplicates or more unlikely to be selected. Referring back to FIG. 9 for example, at first, we can include the prediction modes of the neighbors ("T1-T5", "L1", "L2") in the MPM set after removing the duplicates. If the number of angular modes is still less than four, we can include the above-right, below-left, and the above-left neighbor prediction modes while removing duplicates. The angular modes can then be sorted, for example, using a distance measure. If the number of modes is now greater than 6, we remove some inserted angular modes. Since the above-right and the below-left blocks are beyond the span of the current CU, we do not look at other causal blocks beyond them, such as the blocks that are to the right of above-right block and below the below-left block.

From the statistics, we observe that generally the prediction modes close to the directly horizontal mode (mode 10 in HEVC and mode 18 in JEM) and directly vertical mode (mode 26 in HEVC and mode 50 in JEM) are more likely to be used than the angular modes far from them. Furthermore, for flat rectangular blocks, the modes close to the directly horizontal mode are more probable than the modes at the same distance from directly vertical mode. Similarly, for tall rectangular blocks, the prediction modes close to the directly vertical mode are more likely than the modes at the same distance from the directly horizontal mode. Note the distance between the intra prediction modes can be calculated as a difference between the intra prediction mode indices.

Thus, in one embodiment, we propose to sort the angular modes based on their distances from either directly horizontal or directly vertical mode. That is, if the mode is horizontal-oriented (i.e., a mode closer to the directly horizontal mode than to the directly vertical mode, for example, the mode index is in the range 2-17 in HEVC and range 2-33 in JEM), we compute its distance from the directly horizontal mode (e.g., mode 10 in HEVC and mode 18 in JEM), and if the mode is vertical-oriented (i.e., a mode closer to the directly vertical mode than to the directly horizontal mode, for example, the mode index is in the range 18-34 in HEVC and range 34-66 in JEM), we compute its distance from the directly vertical mode (e.g., mode 26 in HEVC and mode 50 in JEM). The angular modes are then sorted based on the computed distances. If the number of angular modes is greater than four, we keep only the four angular modes with the shortest distances. The sorting can be done for all CU despite their shapes.

In another embodiment, the above selection method is only used for square CUs. If the CU is flat rectangular, we compute the distance of the angular modes from the directly horizontal mode, and if the CU is tall rectangular, we compute the distance of the angular modes from the directly vertical mode. Then we sort the angular modes based on the computed distances. If the number of angular modes is greater than 4, we select only the four modes with the shortest distances.

The various arrangements of sorting the angular modes can be used in other implementations, for example, to modify JEM 2.0 or JEM 3.0 when the neighbor blocks are chosen in different manners.

Since the planar and DC modes are the most probable modes in typical video sequences modelling slow-changing intensity regions, we will usually include them in the MPM set in the order, first planar, then DC, after checking for duplicates. Both these modes can be inserted in the MPM set, for example, at the beginning of the MPM set, or after the sorted modes from the above and left neighbor blocks.

In the above, we describe that the search order for the MPMs can be modified, and that the choice of neighboring blocks can also be modified. In various embodiments, the modifications of the search order and the choice of neighbor blocks can be implemented separately or in combination.

Figure 10:
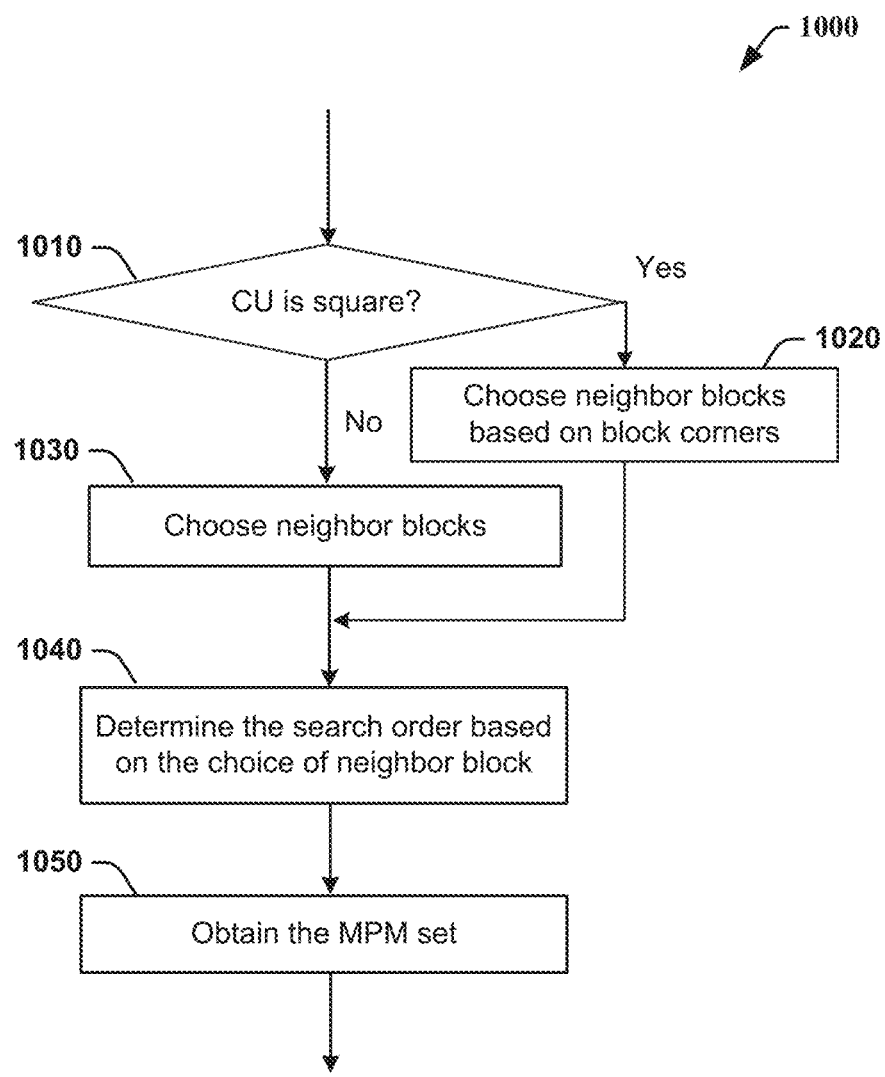
FIG. 10 illustrates a method for obtaining the MPM set, according to an embodiment of the present principles.

FIG. 10 illustrates an exemplary method 1000 for obtaining the MPM set, according to an embodiment of the present principles. Method 1000 can be implemented at the encoder and decoder. Generally, the same method of obtaining the MPM set should be used at both the encoder and decoder such that a bitstream generated by the encoder can be properly decoded by the decoder.

In method 1000, when a current CU is square (i.e., CU height=width) (1010), the existing JEM 3.0 choice of neighbor blocks, namely, blocks around the corners of the current CU, for obtaining the MPMs can be used (1020). Otherwise, if the current CU is a tall or flat one (i.e., CU height>width, or CU height<width, respectively), then the choice of neighbor blocks may be modified (1030). In one example, for a flat block, neighbor blocks can be chosen from below_left, left, above_left, two neighbor blocks that are above the current CU and are located at a distance smaller than the width along the width dimension. In various embodiments, one neighbor block above the CU is specified by a sample at location (x, −1), and the other neighbor block above the CU is specified by a sample at location (x+1, −1), where the sample locations are with respect to the above_left corner of the current CU, $x < CU_W$.

Because we intend to select these neighbor blocks away from the corners, we may also refer to such neighbor blocks as above_intermediate neighbor blocks along the above side and as left_intermediate neighbor blocks along the left side. In some specific and non-limiting examples, x may be set to $CU_H$ or $CU_W/2$. In a different embodiment, only one of the two above_intermediate neighbor blocks is used for the MPM set construction. Similarly, for a tall block, neighbor blocks can be chosen from above, above_right, above_left, one or two left_intermediate neighbor blocks that are left to the current CU and are located at a distance smaller than the height along the height dimension.

For an above_intermediate neighbor block, its left side and a right side (at x-coordinates $x_L$ and $x_R$, respectively) may stay within the boundary of the current block, namely, does not reach (i.e., align with) or go beyond the current block's boundary ($x_L > 0$ and $x_R < CU_W$). Similarly, a left_intermediate neighbor block may also stay within the top and bottom boundaries of the current block.

Figure 11:
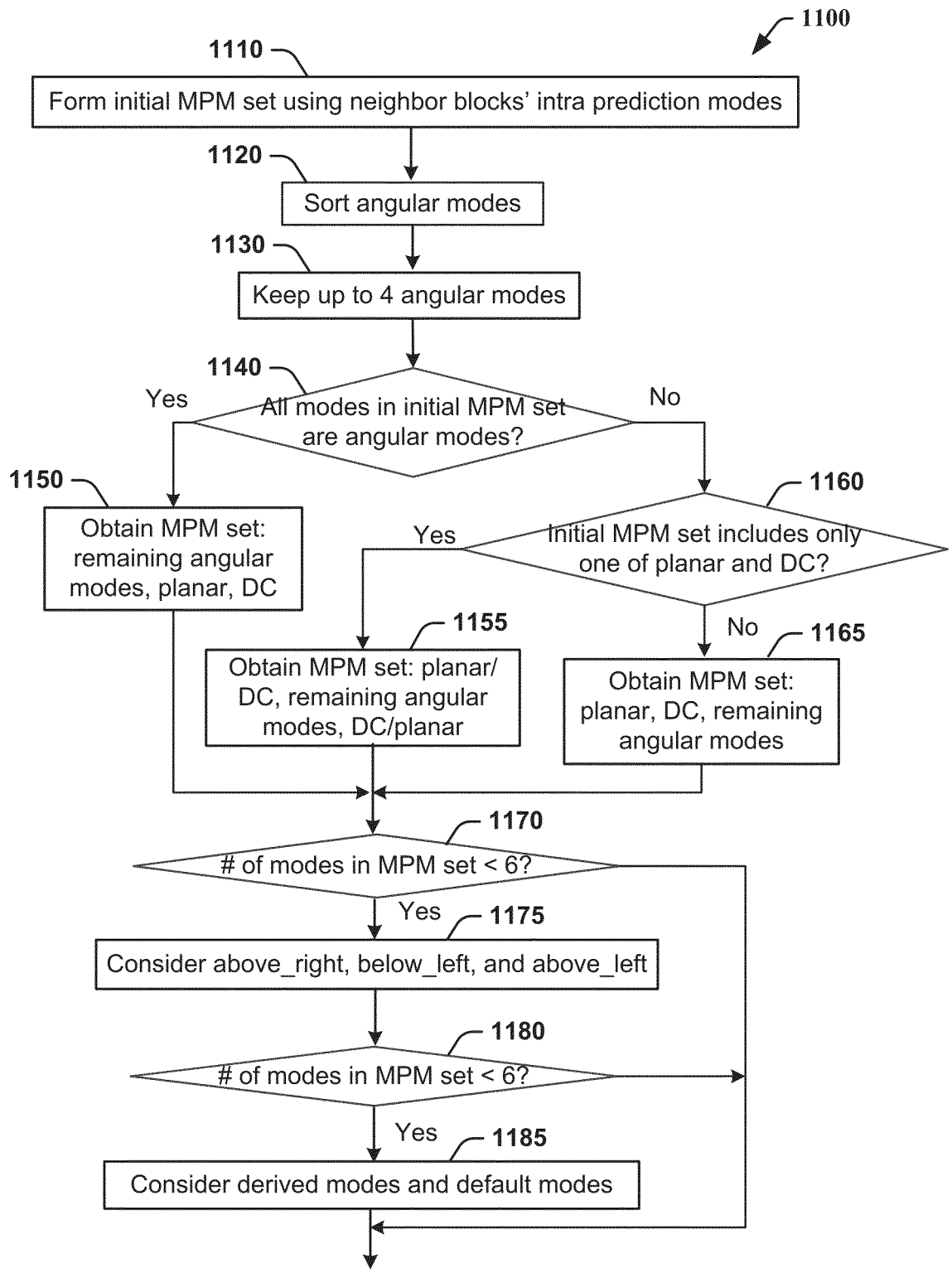
FIG. 11 illustrates another method for obtaining the MPM set, according to an embodiment of the present principles.

At step 1040, the search order of the neighbor blocks can be determined, for example, based on the block shape as shown in FIG. 8(a) or FIG. 8(b), or based on distances from the vertical or horizontal mode as described above. At step 1050, the MPM set can be obtained, including intra modes from neighbor blocks wherein some of the neighbor blocks may be eliminated, and may also include other modes, such as planar or DC modes, FIG. 11 illustrates another method 1100 for constructing the MPM set, according to an embodiment of the present principles. Method 1100 can be used at both an encoder and decoder for obtaining the MPM set, respectively. At step 1110, we search for all intra-coded neighbor blocks on the left side and the above side of the current CU. If such blocks are available, we include their prediction modes in the initial MPM set. In different implementations, the initial MPM set may just search a sub-set of neighbor blocks as known to the encoder and decoder.

The angular intra prediction modes in the initial MPM set are then sorted (1120). For example, we can sort them in the increasing order of their distances from either the directly horizontal or directly vertical, whichever is nearer. In another example, we may compute distances according to the current CU shape. If the current CU is of square shape, then the distances of the angular modes (for sorting purpose) are computed from the directly horizontal or from directly vertical, whichever is nearer. But if the current CU is flat rectangular, then the distances of the angular modes are computed with respect to the directly horizontal mode before sorting. If the current CU is tall rectangular, then the distances of the angular modes are computed with respect to the directly vertical mode before sorting.

If the number of angular modes is greater than four, we keep (1130) only the first four modes in the sorted set and remove the remaining ones. If the modes in the initial MPM set are all angular (1140), then we include (1150) planar and DC modes, in that order, after the remaining angular modes, to make the number of MPM modes six.

Otherwise, if the initial MPM set includes either planar or DC, but not both (1160), we form (1155) the MPM set with the DC or planar mode followed by the remaining sorted angular modes, and then we include planar or DC mode, whichever is not already included, in the set to make the number of MPM modes six. If the initial MPM set includes both planar and DC, we form (1165) the MPM set using these two modes, first planar and then DC, in the beginning of the set followed by the sorted angular modes.

At this point, if the total number of modes in the set is still less than six (1170), then we consider (1175) the modes of above_right, below_left and above_left blocks in the MPM set excluding duplications. We sort them according to their distances from the directly horizontal or the directly vertical whichever is nearer, and place them after the already included modes. If the number of modes is greater than six, we remove the extra modes from the sorted list. Otherwise, if the total number of modes is still less than six (1180), we first consider the derived modes, and then, if required, the default modes to complete (1185) the set. After the MPM set is obtained, the encoding of the intra prediction mode can be performed.

In a different embodiment, we also consider all causal neighbor blocks of the current CU, but we consider the left neighbors and the above neighbors separately. If the current CU is of square shape, then we follow the process as described in method 1100. But if the current CU is flat rectangular, first we search for the left neighbor blocks and include their prediction modes in the set excluding duplications and sort the angular modes placing planar and DC (if present) at the front. We call the resulting list of intra prediction modes the left sub-list. Then we search for the above neighbor blocks and do the same with their prediction modes. This provides another sub-list, which we call the above sub-list. We append the above sub-list to the left sub-list excluding duplications. At this stage, if the number of modes is greater than six, then we remove the extra angular modes from the end of the list to make the size six. Otherwise, we follow similar steps as described with respect to method 1100, first appending, planar and DC modes to the list, then the sorted modes of above-right, below-left, above-left blocks, then the derived modes, and finally the default modes to arrive at an MPM set of six modes. Different sorting methods as described above can be used here.

Figure 12:
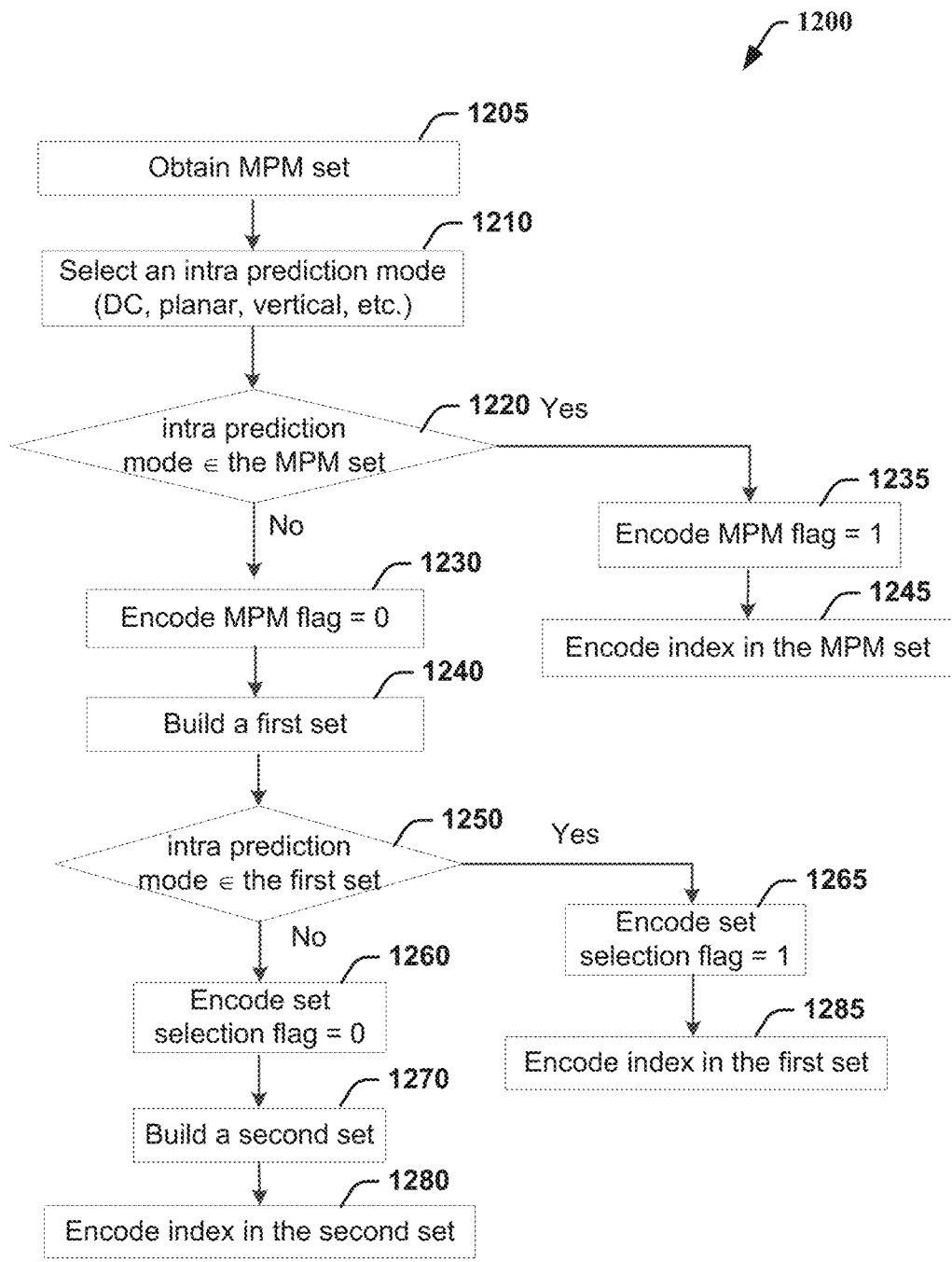
FIG. 12 illustrates an exemplary method of encoding the intra prediction mode, according to the present principles.

FIG. 12 illustrates an exemplary method 1200 for encoding the intra prediction mode for a current block, according to an embodiment of the present principles. For a current block to be encoded in the intra mode, an MPM set is obtained (1205), for example, using method 1000 or 1100. The intra prediction mode, for example, a DC, planar, or directional mode, is selected (1210) for the current block, for example, based on a rate-distortion criterion. The intra prediction mode and the prediction residue are then encoded.

To encode the intra prediction mode, the encoder checks (1220) whether the selected intra prediction mode is included in the MPM set. If the intra prediction mode is in the MPM set, the MPM flag is set (1235) to 1, and both the MPM flag and the MPM index for the selected intra prediction mode are encoded (1245) into the bitstream.

If the selected intra prediction mode is not in the MPM set, the MPM flag is set (1230) to 0, and is encoded into the bitstream. Then the remaining modes are sorted according to their indices in increasing order. The first set, called the selected set, is built (1240) to include every fourth mode in the sorted list, and thus contains sixteen modes. If the prediction mode belongs to the selected set (1250), a set selection flag is set (1265) to 1 to signal that the mode belongs to the selected set, and the prediction mode is encoded (1285) using a 4-bit fixed length code of the index of the selected intra prediction mode in the first set. Otherwise, if the prediction mode does not belong to the selected set, the set selection flag is set (1260) to 0 to signal that the mode belongs to the second set. The second set is built (1270) to include remaining 45 modes, and the prediction mode is encoded (1280) using a truncated binary code signal the index in in the second set.

Figure 13:
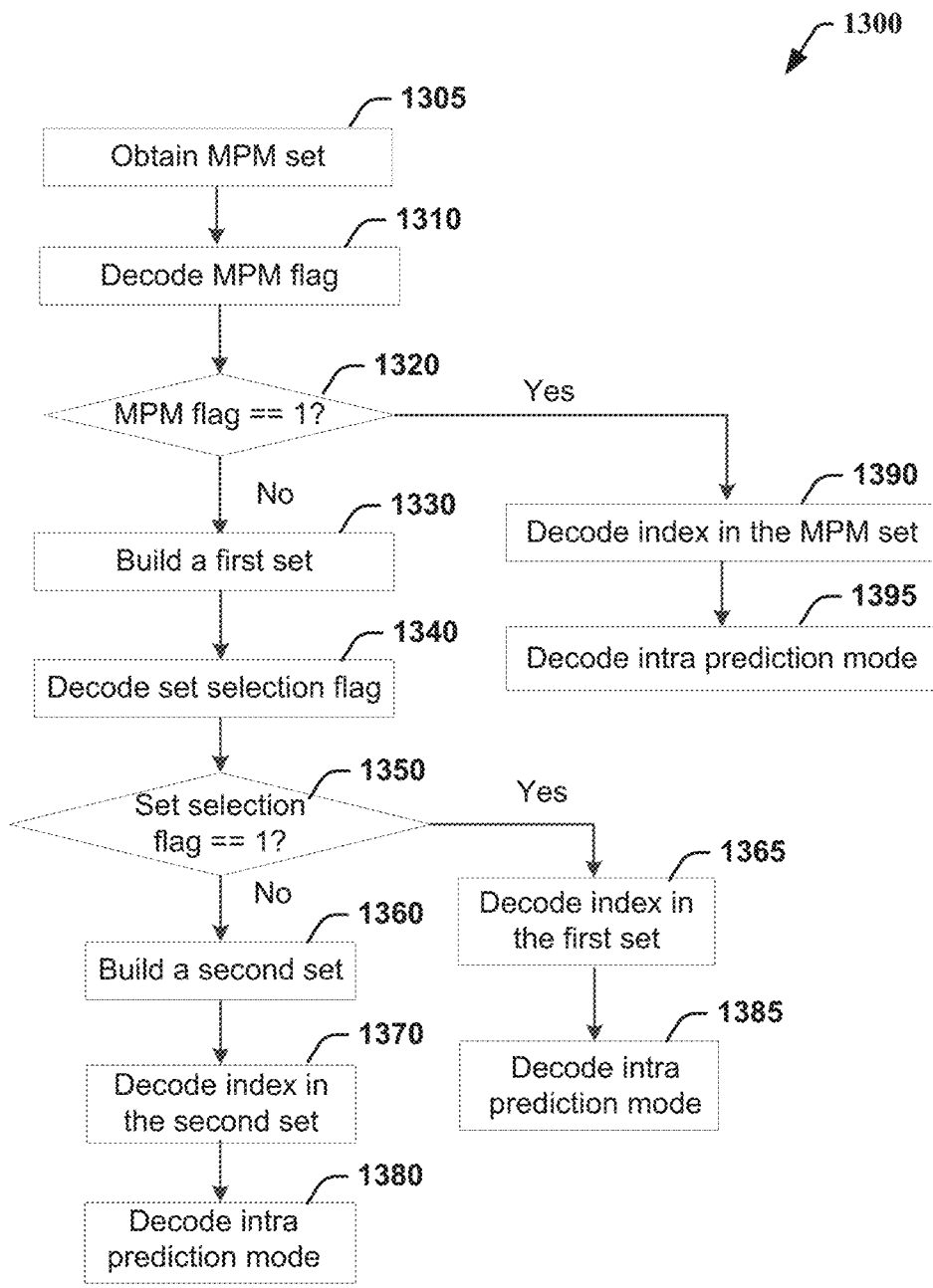
FIG. 13 illustrates an exemplary method of decoding the intra prediction mode, according to the present principles.

FIG. 13 illustrates an exemplary method 1300 for decoding the intra prediction mode for a current block, according to an embodiment of the present principles. The input to method 1300 may be a bitstream, for example, encoded using method 1200. For a current block to be decoded in the intra mode, an MPM set is obtained (1305), for example, using method 1000 or 1100. The intra prediction mode and the prediction residue are then decoded.

To decode the intra prediction mode, the decoder decodes (1310) an MPM flag, and checks (1320) if the decoded value is 1 or 0. A decoded value of 1 indicates that the selected intra prediction mode is included in the MPM set. If the intra prediction mode is in the MPM set, namely the MPM flag is decoded to be to 1, the MPM index corresponding to the intra prediction mode is decoded (1390) from the bitstream. Subsequently, the intra prediction mode can be decoded (1395).

If the intra prediction mode is not in the MPM set, namely, if the MPM flag is decoded as 0, then the remaining modes (excluding the modes in the MPM set) are sorted according to their indices in increasing order. A first set, or a "selected set," is built (1330) to include every fourth mode in the sorted list, and thus contains sixteen modes. The decoder decodes (1340) a set selection flag from the bitstream. If the prediction mode belongs to the selected set (1350), namely, if the set selection flag is decoded as 1, a 4-bit fixed length code of the index of the intra prediction mode in the selected set is decoded (1365). Subsequently, the intra prediction mode can be decoded (1385).

Otherwise, if the prediction mode does not belong to the selected set, namely, if the set selection flag is decoded as 0, a second set is built (1360) to include remaining 45 modes. An index in the second set is decoded (1370) using a truncated binary code. Subsequently, the intra prediction mode is decoded (1380). Based on the decoded intra prediction block, the block can be decoded.

As described above, a default MPM set may be used when there are fewer than a pre-defined number (for example, 6 as in JEM 3.0) of MPMs after the neighbor or derived intra prediction modes are considered. In JEM 3.0, the default MPM set contains the following six modes: planar, DC, directly vertical (mode 50), directly horizontal (mode 18), diagonal_up (mode 2) and diagonal_down (mode 34). In one embodiment, we adapt the default set according to the BT CU shape. If the CU has a flat rectangle shape (that is, height<width), we modify the default MPM set to contain the following modes in the order: planar, DC, purely horizontal (mode 18), purely vertical (mode 50), diagonal_up (mode 2) and diagonal down (mode 34). However, if the CU has a tall rectangle shape (that is, width<height), we use the following default set where the modes are in order: planar, DC, purely vertical (mode 50), purely horizontal (mode 18), right diagonal_down (mode 66) and diagonal down (mode 34). Clearly, this embodiment will not result in a different MPM set from those by earlier embodiments if we do not need the default MPM set while constructing the MPM set, that is, if we are able to construct an MPM set of six different prediction modes, using the modes of the left and above neighbor blocks, planar and DC modes, the modes of above-right, below-left, and above-left blocks, and the derived modes. The encoder and decoder both follow this procedure to have identical MPM sets.

In the above, we use the JEM 3.0 codec, which is based on the HEVC codec, as a basis to illustrate different embodiments. Except for the MPM set construction for intra prediction, other tools may remain unchanged. The proposed intra prediction tools such as PDPC, RSAF, and NSST (Nonseparable Secondary Transform) may also remain unchanged. It should be noted that according to the present embodiments, no extra syntax is needed to signal the modification of the search order or the modification of the choice of neighbor blocks; both the encoder and the decoder derive the proposed MPM order or neighbor blocks based on the current CU's context, in particular the current CU's shape.

As described above, the present embodiments aim at improving the intra prediction mode coding for the luma component with a QTBT structure. It proposes to reorder the MPM modes according to the block size configuration, namely, the block height and block width, of BT blocks. Doing so increases the probability of finding the best candidate mode with a lower index, which results in a lower length code and thus better coding performance. Furthermore, the search for the candidate prediction mode in the MPM set would take less time since the more probable modes have lower indices, and as the search is performed starting with the first index. This, therefore, would result in lower complexity at the encoder and decoder.

In addition, choosing the neighbor blocks in-between the corners, instead around the corner, is also proposed. Since the prediction mode of the block in the middle may be more correlated to that of the current block if there are multiple CUs above or to the left of the current CU, choosing the neighbor blocks in the middle for the MPM set construction may be advantageous. If there is only one CU on top, for example, as shown in FIGS. 7(a), 7(b), 7(d), 7(e), 7(k) and 7(l) when the width of the above CU is at least the width of the current CU, the same neighbor block is actually selected despite one may intend to select the neighbor in the middle or at the corner.

In the above, we describe encoding and decoding of intra prediction modes, using JVET 3.0 as the basis for improvement. The present principles can be applied when MPMs are encoded in different ways. For example, the encoding of the MPMs as in Table 3 is designed assuming that the MPMs are arranged in strictly decreasing order of probability. Other encoding tables can be designed based on similar intuition, and can still have variable-length codes for MPMs. Furthermore, the binary codes in Table 3 undergo CABAC encoding. In JEM 3.0, the first three bits of the code are context-encoded where the contexts are decided based on the first three MPM modes in respective order. If the candidate MPM has index greater than 3, then the bits after the first three bits are bypass encoded, that is, they are encoded without any context information but with equal probabilities for 0 and 1. This particular CABAC encoding method can be replaced by other methods, for example, by a more sophisticated context-encoding methods without changing the order of MPMs as proposed here. The choice of neighbor blocks can also work in other versions of JVET or other standards. For example, the neighbor blocks above or to the left of the current CU may be chosen in the middle as described while other neighbor blocks are chosen differently than what are described above.

Various methods are described above, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, the number of MPMs in the MPM set, six, the distance along the horizontal or vertical dimension of a chosen neighbor block. It should be noted that the specific values are for exemplary purposes and the present principles are not limited to these specific values.

In the above, various embodiments are described with respect to JVET based on the HEVC standard. For example, various methods of choosing neighbor blocks when constructing the MPM set as described above can be used to modify the intra prediction module (160, 360) of the JVET or HEVC encoder and decoder as shown in FIG. 1 and FIG. 3. However, the present principles are not limited to JVET or HEVC, and can be applied to other standards, recommendations, and extensions thereof.

Figure 14:
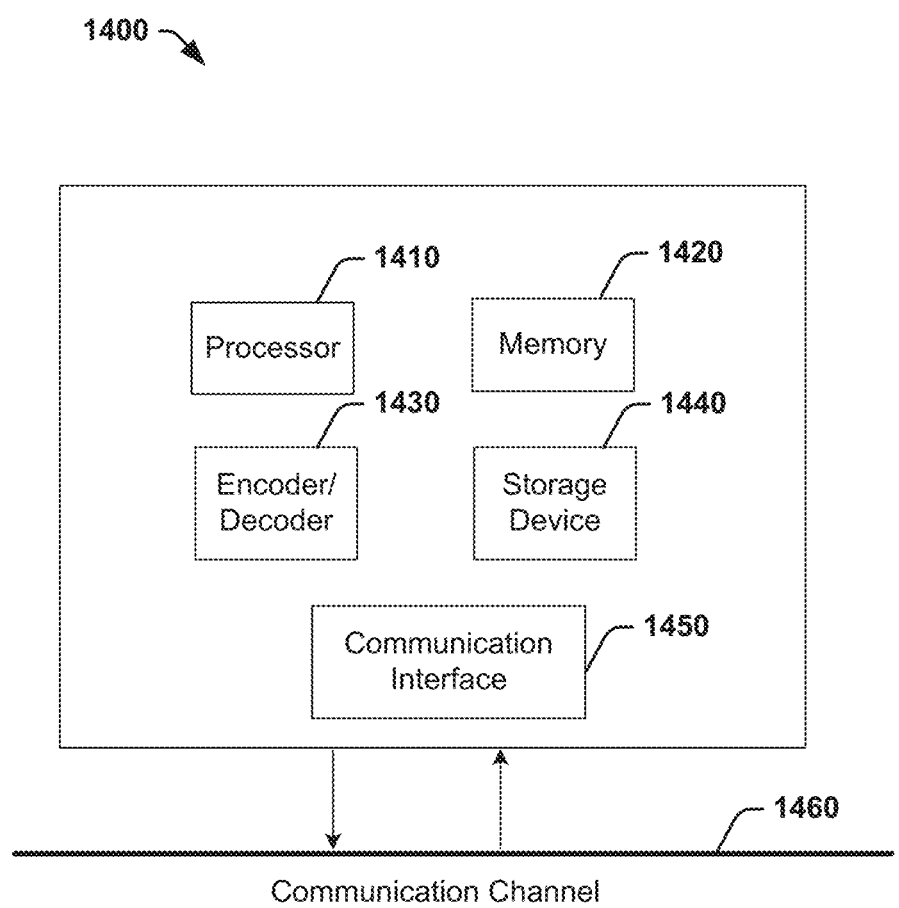
FIG. 14 illustrates a block diagram of an exemplary system in which various aspects of the exemplary embodiments of the present principles may be implemented.

FIG. 14 illustrates a block diagram of an exemplary system in which various aspects of the exemplary embodiments of the present principles may be implemented. System 1400 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 1400 may be communicatively coupled to other similar systems, and to a display via a communication channel as shown in FIG. 14 and as known by those skilled in the art to implement the exemplary video system described above.

The system 1400 may include at least one processor 1410 configured to execute instructions loaded therein for implementing the various processes as discussed above. Processor 1410 may include embedded memory, input output interface and various other circuitries as known in the art. The system 1400 may also include at least one memory 1420 (e.g., a volatile memory device, a non-volatile memory device). System 1400 may additionally include a storage device 1420, which may include non-volatile memory, including, but not limited to, EEPROM, ROM, PROM, RAM, DRAM, SRAM, flash, magnetic disk drive, and/or optical disk drive. The storage device 1440 may comprise an internal storage device, an attached storage device and/or a network accessible storage device, as non-limiting examples. System 1400 may also include an encoder/decoder module 1430 configured to process data to provide an encoded video or decoded video.

Encoder/decoder module 1430 represents the module(s) that may be included in a device to perform the encoding and/or decoding functions. As is known, a device may include one or both of the encoding and decoding modules. Additionally, encoder/decoder module 1430 may be implemented as a separate element of system 1400 or may be incorporated within processors 1410 as a combination of hardware and software as known to those skilled in the art.

Program code to be loaded onto processors 1410 to perform the various processes described hereinabove may be stored in storage device 1440 and subsequently loaded onto memory 1420 for execution by processors 1410. In accordance with the exemplary embodiments of the present principles, one or more of the processor(s) 1410, memory 1420, storage device 1440 and encoder/decoder module 1430 may store one or more of the various items during the performance of the processes discussed herein above, including, but not limited to the input video, the decoded video, the bitstream, equations, formula, matrices, variables, operations, and operational logic.

The system 1400 may also include communication interface 1450 that enables communication with other devices via communication channel 1460. The communication interface 1450 may include, but is not limited to a transceiver configured to transmit and receive data from communication channel 1460. The communication interface may include, but is not limited to, a modem or network card and the communication channel may be implemented within a wired and/or wireless medium. The various components of system 1400 may be connected or communicatively coupled together using various suitable connections, including, but not limited to internal buses, wires, and printed circuit boards.

The exemplary embodiments according to the present principles may be carried out by computer software implemented by the processor 1410 or by hardware, or by a combination of hardware and software. As a non-limiting example, the exemplary embodiments according to the present principles may be implemented by one or more integrated circuits. The memory 1420 may be of any type appropriate to the technical environment and may be implemented using any appropriate data storage technology, such as optical memory devices, magnetic memory devices, semiconductor-based memory devices, fixed memory and removable memory, as non-limiting examples. The processor 1410 may be of any type appropriate to the technical environment, and may encompass one or more of microprocessors, general purpose computers, special purpose computers and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video encoding, comprising:
accessing a block of a picture;
determining an intra prediction mode for said block;
accessing a plurality of neighbor blocks of said block;
obtaining a distance between an intra prediction mode of each of said accessed plurality of neighbor blocks of said block and one of a directly vertical intra prediction mode and a directly horizontal intra prediction mode;
selecting N intra prediction modes respectively from N blocks of said plurality of neighbor blocks, wherein N is an integer and N>1, and wherein said N neighbor blocks correspond to smaller distances to said one of a directly vertical intra prediction mode and a directly horizontal intra prediction mode than other neighbor blocks in said plurality of neighbor blocks;
obtaining a set of intra prediction mode candidates for said block, said set including said N selected intra prediction modes; and
encoding an index corresponding to said determined intra prediction mode in said set.

2. The method of claim 1, wherein a width of said block is different from a height of said block, further comprising:
selecting a sample adjacent to said block, along a longer side of said block, wherein said sample is located at a distance smaller than a length of said longer side of said block, and wherein a first neighbor block is specified by said selected sample.

3. The method of claim 2, wherein said sample is located at a distance equal to a shorter side of said block or at a distance half of said longer side of said block.

4. The method of claim 1, wherein a subset of neighbor blocks along a longer side of said block is selected before another subset of neighbor blocks along a shorter side of said block.

5. The method of claim 1, further comprising:
sorting angular intra prediction modes corresponding to said plurality of neighbor blocks based on said obtained distances.

6. A method for video decoding, comprising:
accessing data indicative of a block of a picture from a bitstream;
accessing a plurality of neighbor blocks of said block;
obtaining a distance between an intra prediction mode of each of said accessed plurality of neighbor blocks of said block and one of a directly vertical intra prediction mode and a directly horizontal intra prediction mode;
selecting N intra prediction modes respectively from N blocks of said plurality of neighbor blocks, wherein N is an integer and N>1, and wherein said N neighbor blocks correspond to smaller distances to said one of a directly vertical intra prediction mode and a directly horizontal intra prediction mode than other neighbor blocks in said plurality of neighbor blocks;
obtaining a set of intra prediction mode candidates for said block, said set including said N selected intra prediction modes; and
decoding an index in said set;
determining an intra prediction mode for said block corresponding to said index in said set; and
decoding said block based on said determined intra prediction mode.

7. The method of claim 6, wherein a width of said block is different from a height of said block, further comprising:
selecting a sample adjacent to said block, along a longer side of said block, wherein said sample is located at a distance smaller than a length of said longer side of said block, and wherein a first neighbor block is specified by said selected sample.

8. The method of claim 7, wherein said sample is located at a distance equal to a shorter side of said block or at a distance half of said longer side of said block.

9. The method of claim 6, wherein a subset of neighbor blocks along a longer side of said block is selected before another subset of neighbor blocks along a shorter side of said block.

10. The method of claim 6, further comprising:
sorting angular intra prediction modes corresponding to said plurality of neighbor blocks based on said obtained distances.

11. An apparatus for video encoding, comprising at least a memory and one or more processors, said one or more processors configured to:
- access a block of a picture;
- determine an intra prediction mode for said block;
- access a plurality of neighbor blocks of said block;
- obtain a distance between an intra prediction mode of each of said accessed plurality of neighbor blocks of said block and one of a directly vertical intra prediction mode and a directly horizontal intra prediction mode;
- select N intra prediction modes respectively from N blocks of said plurality of neighbor blocks, wherein N is an integer and N>1, and wherein said N neighbor blocks correspond to smaller distances to said one of a directly vertical intra prediction mode and a directly horizontal intra prediction mode than other neighbor blocks in said plurality of neighbor blocks;
- obtain a set of intra prediction mode candidates for said block, said set including said N selected intra prediction modes; and
- encode an index corresponding to said determined intra prediction mode in said set.

12. The apparatus of claim 11, wherein a width of said block is different from a height of said block, wherein said one or more processors are further configured to perform:
- selecting a sample adjacent to said block, along a longer side of said block, wherein said sample is located at a distance smaller than a length of said longer side of said block, and wherein a first neighbor block is specified by said selected sample.

13. The apparatus of claim 12, wherein said sample is located at a distance equal to a shorter side of said block or at a distance half of said longer side of said block.

14. The apparatus of claim 11, wherein a subset of neighbor blocks along a longer side of said block is selected before another subset of neighbor blocks along a shorter side of said block.

15. The apparatus of claim 11, wherein said one or more processors are further configured to sort angular intra prediction modes corresponding to said plurality of neighbor blocks based on said obtained distances.

16. An apparatus for video decoding, comprising at least a memory and one or more processors, said one or more processors configured to:
- access data indicative of a block of a picture from a bitstream;
- access a plurality of neighbor blocks of said block;
- obtain a distance between an intra prediction mode of each of said accessed plurality of neighbor blocks of said block and one of a directly vertical intra prediction mode and a directly horizontal intra prediction mode;
- select N intra prediction modes respectively from N blocks of said plurality of neighbor blocks, wherein N is an integer and N>1, and wherein said N neighbor blocks correspond to smaller distances to said one of a directly vertical intra prediction mode and a directly horizontal intra prediction mode than other neighbor blocks in said plurality of neighbor blocks;
- obtain a set of intra prediction mode candidates for said block, said set including said N selected intra prediction modes; and
- decode an index in said set;
- determine an intra prediction mode for said block corresponding to said index in said set; and
- decode said block based on said determined intra prediction mode.

17. The apparatus of claim 16, wherein a width of said block is different from a height of said block, wherein said one or more processors are further configured to perform:
- selecting a sample adjacent to said block, along a longer side of said block, wherein said sample is located at a distance smaller than a length of said longer side of said block, and wherein a first neighbor block is specified by said selected sample.

18. The apparatus of claim 17, wherein said sample is located at a distance equal to a shorter side of said block or at a distance half of said longer side of said block.

19. The apparatus of claim 16, wherein a subset of neighbor blocks along a longer side of said block is selected before another subset of neighbor blocks along a shorter side of said block.

20. The apparatus of claim 16, wherein said one or more processors are further configured to sort angular intra prediction modes corresponding to said plurality of neighbor blocks based on said obtained distances.

* * * * *